United States Patent [19]

Mizuno et al.

[11] Patent Number: 5,408,007
[45] Date of Patent: Apr. 18, 1995

[54] RUBBER COMPOSITION HAVING GOOD CROSSLINKING ADHESION TO FIBER MATERIALS

[75] Inventors: Takahide Mizuno; Masayoshi Nakajima, both of Kobe; Takashi Hamada, Kakogawa; Nobutake Osako; Kasutoshi Ishida, both of Kobe, all of Japan

[73] Assignee: Mitsuboshi Belting Ltd., Nagata, Japan

[21] Appl. No.: 887,098

[22] Filed: May 22, 1992

[30] Foreign Application Priority Data

May 24, 1991 [JP] Japan .................................. 3-149924

[51] Int. Cl.⁶ .................. C08F 255/04; C08F 263/04; C08F 259/02; C08F 265/08; C08F 279/02; C08F 283/06
[52] U.S. Cl. ..................................... 525/305; 525/187; 525/191; 525/236; 525/263; 525/301; 525/304; 525/292; 525/302; 525/404
[58] Field of Search ............... 525/187, 191, 236, 305, 525/301, 304, 263, 292, 302, 404

[56] References Cited

U.S. PATENT DOCUMENTS

| | | | |
|---|---|---|---|
| 3,344,105 | 9/1967 | McDonel et al. | 525/274 |
| 3,781,380 | 12/1973 | Labana et al. | 525/305 |
| 4,104,329 | 8/1978 | Abdou-Sabet et al. | 525/305 |
| 4,695,508 | 9/1987 | Kageyama et al. | 428/261 |
| 4,720,526 | 1/1988 | Roland | 525/274 |
| 4,925,898 | 5/1990 | Itokazu et al. | 525/305 |

*Primary Examiner*—Vasu S. Jagannathan
*Attorney, Agent, or Firm*—Wood, Phillips, VanSanten, Clark & Mortimer

[57] ABSTRACT

A rubber composition permits good adhesion upon crosslinking to fiber materials and offers good adhesion after thermal aging. The rubber composition includes about 1/10 to about 1/1000 mol of an organic peroxide and either about 0.5 or about 10 parts by weight of an organic compound having two or more acrylate groups or methacrylate groups and one or more carboxyl groups in the molecular structure or about 1 to about 30 parts by weight of a carboxy-modified rubber per 100 parts by weight of a rubber crosslinkable with the organic peroxide.

14 Claims, No Drawings

RUBBER COMPOSITION HAVING GOOD CROSSLINKING ADHESION TO FIBER MATERIALS

TECHNICAL FIELD

The present invention relates to a rubber composition permitting good vulcanizing adhesion to fiber materials, more specifically a rubber composition containing a fiber material for use in rubber products such as driving belts, conveyor belts, tires and hoses.

BACKGROUND OF THE INVENTION

In adhering a rubber composition and a fiber material together, it has been the common practice to treat the fiber material with a resorcinol resin-formalin-rubber latex (RFL) liquid or, for improved adhesion, to treat the fiber material with an epoxy compound or isocyanate compound. A basic dry bonding (HRH) method is also used, in which a diene rubber is admixed with hydrated white carbon [hydrous silica $(SiO_2\text{-}(NH_2O))$], either resorcinol or a resorcinol derivative, and a methylene donor such as hexamethylenetetramine. The HRH method is described in *Rubber Chemistry and Technology*, Vol. 49, p 752. The above common practices produce an adhesion surface on the fiber material. The initial adhesion can be good. However, after thermal aging adhesion declines significantly or adhesive function can to be lost due to adhesion surface hardening due to heat.

Organic peroxides have recently been used in place of sulfur or sulfur compounds to crosslink rubber for the purpose of improving the heat endurance of the crosslinked rubber. However, when using the organic peroxide for crosslinking, treatment of the fibers with RFL liquid causes the resorcinol resin to be reacted and hardened by the organic peroxide, resulting in significant deterioration of the adhesion surface and fiber material. There is significant deterioration of the adhesion surface and fiber material when the organic peroxide is used in the presence of the epoxy compound or isocyanate compound. In the presence of the organic peroxide, the HRH method is also faulty in that it fails to offer sufficient initial adhesion.

There is a desire for a rubber composition having good adhesion to fiber materials after crosslinking, wherein it is unnecessary to treat the fiber material with a RFL liquid, an epoxy compound, an isocyanate compound or the HRH method to adhere the rubber composition and the fiber material, adhesion after crosslinking is good and adhesion after thermal aging is also good. The rubber composition should be applicable to ordinary rubber products such as belts, tires and hoses.

SUMMARY OF THE INVENTION

A rubber composition suitable to be adhered to a fiber material is disclosed. The rubber composition has an organic peroxide, a rubber crosslinkable with the organic peroxide and at least one of (A) an organic compound having two or more acrylate groups or methacrylate groups and one or more carboxyl groups in the molecular structure or (B) a carboxy-modified rubber having two or more double bonds in the molecular structure. The rubber composition has good adhesion to fiber materials after crosslinking and adhesion after thermal aging is also good.

Numerous other advantages and features of the present invention will become readily apparent from the following detailed description of the invention, the figures and the appended claims.

DETAILED DESCRIPTION OF THE PREFERRED EMBODIMENTS

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

A rubber composition of the present invention has good adhesion to fiber materials after crosslinking of the rubber. The rubber composition contains an organic peroxide, a rubber crosslinkable with the organic peroxide and at least one of (A) an organic compound having two or more acrylate groups or methacrylate groups and one or more carboxyl groups in the molecular structure or (B) a carboxy-modified rubber having two or more double bonds in the molecular structure.

The rubber composition can include about 1/10 to about 1/1000 mol of the organic peroxide and about 0.5 to about 10 parts by weight of the organic compound having two or more acrylate groups or methacrylate groups and one or more carboxyl groups in the molecular structure to 100 parts by weight of the rubber crosslinkable with the organic peroxide that is referred to herein as the "crosslinkable rubber".

Alternatively, the rubber composition can have about 1/10 to about 1/1000 mol of the organic peroxide and about 1 to about 30 parts by weight of a carboxy-modified rubber having two or more double bonds in the molecular structure that is referred to herein as the "carboxy-modified rubber" per 100 parts by weight of the crosslinkable rubber.

Examples of the crosslinkable rubber include natural rubber (NR), polyisoprene rubber (IR), styrene-butadiene rubber (SBR), polybutadiene rubber (BR), nitrile rubber (NBR), hydrogenated nitrile rubber (H-NBR), chloroprene rubber (CR), ethylene-propylene rubber (EPM, EPDM), ethylene-vinyl acetate rubber (EVA), chlorinated polyethylene (CM), chlorosulfonated polyethylene (CSM), alkylated chlorosulfonated polyethylene (ACSM), epichlorohydrin rubber (CHC, CHR), the like and admixtures thereof. Preferred crosslinkable rubbers are those suitable for crosslinking with the organic peroxide because their physical properties are not easily affected by crosslinking with commonly used sulfur or sulfur-containing compounds because they do not easily crosslink with sulfur. Specific rubber polymers contain a small amount of unsaturation and have rubber elasticity, such as EPM, EPDM, HNBR, CM, CSM, ACSM, CHC and CHR.

The organic peroxide used in the rubber composition of the present invention may be any organic peroxide, as long as it does not undergo extreme crosslinking at the crosslinking temperature. Examples of suitable organic peroxides include di-t-butyl peroxide, t-butylcumyl peroxide, dicumyl peroxide, 2,5-dimethyl-2,5-di(t-butyl peroxide)-hexane, 2,5-dimethyl-2,5-di(t-butylperoxy)-hexane, 3,1,3-bis-(t-butyl peroxy-isopropyl)-benzene, 1,1-di-t-butylperoxy-3,3,5-trimethylcyclohexane, 1,1-di-t-butylperoxycyclohexane, 4,4-di-t-oxyvaleric acid-n-butyl, 2,2-di-t-butylperoxybutane, the like and admixtures thereof.

The amount of this organic peroxide added is preferably in the range of about 1/10 to about 1/1000 mole per 100 parts by weight of the crosslinkable rubber. Scorching is likely to occur when the amount exceeds about 1/10 mol. Crosslinking does not easily take place when the amount is under about 1/1000 mol. More preferably, the amount of organic peroxide is in the range of about 1/50 to about 1/500 mol.

Examples of the organic compound having one or more acrylate groups or methacrylate groups and one or more carboxyl groups in the molecular structure include compounds resulting from the esterification of polyhydric alcohol, acrylic acid and/or methacrylic acid and subsequent esterification of the remaining alcohol group with polyhydric carboxylic acid or carboxylic anhydride to leave at least one carboxyl group in the molecular structure.

Representative polyhydric alcohols include glycerin, pentaerythritol and the like.

A representative polyhydric carboxylic acid is phthalic acid.

A representative polyhydric carboxylic anhydride is phthalic anhydride.

Suitable organic compounds can be represented by the following Chemical Formulas 1, 2, 3 and 4.

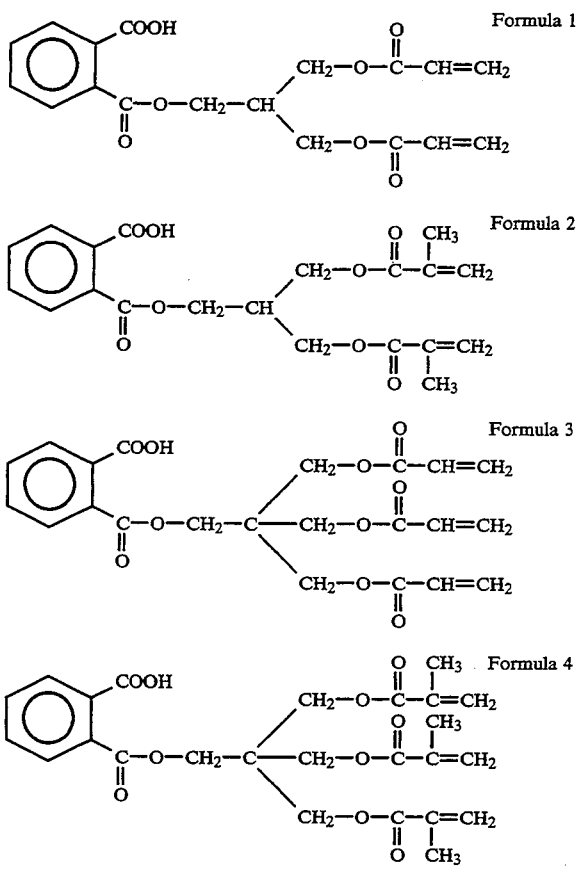

Preferably, the organic compound includes a ring structure. An aliphatic organic compound can be used.

Preferably, the organic compound includes 1 to about 5 carboxyl groups.

Preferably, the organic compound includes at least two acrylate or methacrylate groups.

The carboxy-modified rubber having at least two carbon-carbon double bonds in the molecular structure includes carboxylated isoprene rubber, carboxylated styrene-butadiene rubber, carboxylated nitrile rubber and carboxylated hydrogenated nitrile rubber, whether solid or liquid at room temperature (a temperature in the range of about 20° C. to about 30° C.). The carboxy-modified rubber is present in an amount in the range of about 1 to about 30 parts by weight per 100 parts by weight of the crosslinkable rubber. Amounts under about 1 part by weight fail to offer sufficient adhesion; amounts exceeding 30 parts by weight deteriorate the properties of the crosslinked rubber, particularly heat endurance, due to an excess rise in vulcanizing temperature because it (the carboxy-modified rubber) acts as a co-crosslinking agent and reduces rubber elasticity.

The fiber material includes those fibers that are conventionally used in rubber products. Examples of the fiber material include fatty acid polyamides such as 6,6-nylon, 6-nylon and 4,6-nylon, aromatic polyamides (aramids) such as polyester, vinylon, Technora, Kevlar and Twaron, other organic fibers, carbon fibers, the like and admixtures thereof. The fiber material can take any shape, including filaments, cords (spun yarn), fabric, textiles and blinds.

The rubber composition to be adhered directly to the fiber material contains the crosslinkable rubber, the organic peroxide and one of the organic compound or the carboxy-modified rubber. The rubber composition can either be admixed with a rubber compound or can be used in a paste or solution form in a solution or dispersion in an organic solvent that is separate from the rubber compound and which is applied to the fiber material.

The rubber compound contains rubber and a crosslinking/vulcanizing agent. The rubber can be the same as the rubber of the rubber composition, i.e., a crosslinkable rubber, or can be of a different, conventional polymer type. An organic peroxide or sulfur can be used as the crosslinking/vulcanizing agent in the rubber compound.

Representative organic solvents include toluene, xylene, benzene, methyl ethyl ketone, ethyl acetate, the like and admixtures thereof.

The solution or dispersion of the rubber composition in the organic solvent, which can be referred to as a treating liquid, can have about 10 to about 20 weight percent solids. The treating liquid is applied to the fiber material to achieve a coating, that can impregnate the fiber material, having a weight in the range of about 0.5 to about 10, preferably about 1 to about 5, weight percent based on the weight of the fiber material and coating. A forced air drying oven can be used to remove the organic solvent.

Other components such as zinc oxide, stearic acid, mercaptobenzimidazole, carbon black and the like can be present in the rubber composition.

A preferred method of applying the rubber compound to the rubber composition coated fiber material is to place the rubber compound and rubber composition coating the fiber material in contact and applying an effective amount of pressure and heat for a sufficient time period to crosslink the rubber compound and the rubber composition followed by cooling of the resultant product. Representative of the pressure, temperature and time period are a pressure of about 5 to about 20 kilograms per centimeter squared (kg/cm$^2$), a temperature of about 150° to about 180° C. and a time period of about 15 to about 45 minutes.

The rubber composition offers good adhesion with other rubbers, such as those used in the rubber compound, to obtain the desired rubber product by the rubber composition bonding to the fiber material and to the rubber of the rubber compound. Representative rubber products include driving belts, conveyor belts, tires, hoses and the like.

The rubber compositions incorporates the organic compound or the carboxy-modified rubber which greatly contribute to adhesion with fiber materials. The carboxyl group enhances the affinity of the rubber composition with the fiber materials. When using the rubber composition as an adhesive between a fiber material and the rubber compound it is presently theorized that the acrylate and methacrylate groups of the organic compound and the double bonds of the carboxy-modified rubber have a high affinity with the rubber of the rubber compound, and the carboxyl group improves affinity with the fiber material.

Fiber materials pretreated with RFL do not adhere to the rubber composition of the present invention. It is presently believed that the lack of adherence to RFL treated fiber material is because the carboxyl group of the organic compound or the carboxy-modified rubber cannot react directly with the fiber material due to the presence of RFL coating the surface of the fiber material.

EXAMPLES

The present invention is hereinafter described in more detail by means of the following examples that are provided by way of illustration and not by way of limitation. For each Example and Comparative Example the components were introduced into a Banbury mixer and mixed at a speed of 60 rpm and temperature of 40° to 45° C. for a time period of 150 seconds. The resulting rubber-containing components were dissolved in methyl ethyl ketone at room temperature to produce treating liquids. Fiber material in the form of canvas or aramid cord was treated with treating liquid to obtain about 3 weight percent treating liquid on the canvas. The fiber material was dried in an oven set at a temperature in the range of 80° to 130° C. and run through the oven at a speed of 8 to 12 meters/second.

Examples 1 to 6 and Comparative Example 1

Hydrogenated nitrile rubber (H-NBR), which is a rubber crosslinkable with an organic peroxide, and dicumyl peroxide, an organic peroxide, were kneaded using the Banbury mixer to yield rubber-containing component 1 having the formulation shown in TABLE 1.

TABLE 1

| RUBBER-CONTAINING COMPONENT 1 | |
|---|---|
| Component (ppw) | |
| Zetpole 2010[1] | 100 |
| Zinc oxide | 5 |
| Stearic acid | 1 |
| Anti-aging agent MB[2] | 2 |
| FEF carbon black[3] | 30 |
| Dicumyl peroxide | 2.7 |
| Ethylene glycol dimethacrylate[4] | 2.0 |
| Total | 142.7 |

[1]Hydrogenated nitrile rubber produced by Nipon Zeon Co., Ltd.
[2]2-mercaptobenzimidazole.
[3]Fast extrusion furnace black, a carbon black that is equal to N-550 of ASTM.
[4]A coagent.

The rubber-containing component 1 was then dissolved in methyl ethyl ketone in the amounts shown in TABLE 2, below. COMPARATIVE EXAMPLE 1/Treating Liquid No. contained no organic compound and was not a treating liquid having the rubber composition but rather was a treating liquid having a 15% weight percent (wt %) solid concentration of the rubber-containing component 1. EXAMPLES 1 to 6/Treating Liquid Nos. 2 to 7, respectively, were made by adding the organic compounds of Chemical Formulas 1 to 4, above, in the amounts shown in TABLE 2 and stirring to yield rubber compositions in fiber material treating liquids having a 15 wt % solids concentration of the rubber composition.

TABLE 2

| | TREATING LIQUIDS NO. 1 to 7 | | | | | | |
|---|---|---|---|---|---|---|---|
| | COMPARATIVE EXAMPLE | EXAMPLES | | | | | |
| | 1 | 1 | 2 | 3 | 4 | 5 | 6 |
| Treating liquid no. | 1 | 2 | 3 | 4 | 5 | 6 | 7 |
| Component (ppw) | | | | | | | |
| Rubber-containing component 1 | 142.7 | 142.7 | 142.7 | 142.7 | 142.7 | 142.7 | 142.7 |
| Methyl ethyl ketone | 808.6 | 820.0 | 820.0 | 820.0 | 820.0 | 837.0 | 865.3 |
| Additive 1[1] | | 2.0 | | | | | |
| Additive 2[1] | | | 2.0 | | | | |
| Additive 3[1] | | | | 2.0 | | | |
| Additive 4[1] | | | | | 2.0 | 5.0 | 10.0 |
| Total | 951.3 | 964.7 | 964.7 | 964.7 | 964.7 | 984.7 | 1018.0 |
| Solid concentration | 15.0 | 15.0 | 15.0 | 15.0 | 15.0 | 15.0 | 15.0 |

[1]Additives 1 to 4 are organic compounds of Formulas 1 to 4, respectively.

Nylon canvases whose warp and weft were made of 6,6-nylon (texture $210^D \times 210^D/1/100$ yarns/5 cm/120 yarns/5 cm) were impregnated with treating liquid nos. 1 through 7. After air drying in the oven, each impregnated canvas was laminated on a 3.0 millimeter (mm) thick pressure rolled sheet of the rubber-containing composition 1 and crosslinked at a crosslinking press pressure of 10 kg/cm² and a temperature of 165° C. for a time period of 30 minutes to produce samples. After keeping each sample standing to cool for 24 hours, initial adhesion force was measured using an autograph commercially available from Shimazu Corporation, Japan. The autograph was operated at a speed of extension of 50 mm/min and room temperature. Next, the same sample was subjected to thermal aging in a 140° C. Geer forced air oven for 70 hours, after which the adhesion force was measured in the same manner as with the initial adhesion force. The adhesion test results are shown in TABLE 3, below.

force after thermal aging as compared to the adhesion force for the sample having the canvas treated with the treating liquid that did not contain the rubber composition (COMPARATIVE EXAMPLE 1). The adhesion actually increased after thermal aging for EXAMPLES 2 to 5.

Examples 7 to 10 and Comparative Examples 2 to 4

Rubber compositions 1 to 4 and rubber-containing components 2 to 4 having the formulations disclosed in TABLE 4, below, were produced by kneading the components using the Banbury mixer. The rubber compositions and rubber-containing components were each dissolved in methyl ethyl ketone in the amounts disclosed in TABLE 5, below, in the same manner as in EXAMPLES 1 through 6 to yield 15 wt % treating liquids Nos. 8 to 11 from rubber compositions 1 to 4, respectfully, and treating liquids nos. 12 to 14 from rubber-containing components 2 to 4, respectfully.

TABLE 3

ADHESION TEST RESULTS

| | COMPARATIVE EXAMPLE 1 | EXAMPLE 1 | EXAMPLE 2 | EXAMPLE 3 | EXAMPLE 4 | EXAMPLE 5 | EXAMPLE 6 |
|---|---|---|---|---|---|---|---|
| Treating liquid No. | 1 | 2 | 3 | 4 | 5 | 6 | 7 |
| Initial adhesion (kgf/25 mm) | 5.2 | 7.3 | 7.5 | 8.2 | 9.5 | 11.7 | 10.3 |
| Adhesion after thermal aging (kgf/25 mm) | 3.5 | 7.0 | 7.7 | 8.4 | 10.3 | 12.1 | 8.2 |

As seen in TABLE 3, the samples containing the canvas treated with the treating liquid containing the rubber compositions (EXAMPLES 1 to 6) showed improvements in initial adhesion force and adhesion

TABLE 4

RUBBER COMPOSITIONS AND RUBBER-CONTAINING COMPONENTS

| | RUBBER COMPOSITIONS | | | | RUBBER-CONTAINING COMPONENTS | | |
|---|---|---|---|---|---|---|---|
| Components (ppw) | 1 | 2 | 3 | 4 | 2 | 3 | 4 |
| Zetpole 2020[1] | 100 | 100 | 100 | 100 | 100 | 100 | 100 |
| Carboxylated NBR[2] | 5 | 10 | — | — | — | 35 | — |
| Carboxylated IR[3] | — | — | 5 | — | — | — | — |
| Carboxylated SBR[4] | — | — | — | 5 | — | — | — |
| NBR | — | — | — | — | — | — | 5 |
| Zinc oxide | 5 | 5 | 5 | 5 | 5 | 5 | 5 |
| Stearic Acid | 1 | 1 | 1 | 1 | 1 | 1 | 1 |
| Anti-aging agent MB[5] | 2 | 2 | 2 | 2 | 2 | 2 | 2 |
| FEF Carbon Black | 40 | 40 | 40 | 40 | 40 | 40 | 40 |
| Peroxide[6] | 1.5 | 1.5 | 1.5 | 1.5 | 1.5 | 1.5 | 1.5 |

[1]Hydrogenated NBR produced by Nippon Zeon Co., Ltd.
[2]Nipol 1072J, produced by Nippon Zeon Co., Ltd.
[3]Terminal-carboxylated (—COOH) isoprene rubber.
[4]Terminal-carboxylated (—COOH) styrene-butadiene rubber.
[5]2-mercaptobenzimidazole
[6]1,3-bis (tertiary-butylperoxy-isopropyl) benzene, an organic peroxide, produced by Nippon Oil & Fats Co., Ltd.

Next, nylon canvases disclosed above were impregnated with the treating liquid in the same manner as the tests in EXAMPLES 1 to 6. After air drying, each piece of impregnated nylon canvas was laminated on a 3.0 mm thick pressure rolled rubber sheet of the rubber-containing composition of TABLE 1 and pressed using a crosslinking press at a surface pressure of 10 kg/cm² and 165° C. for 30 minutes to produce samples. After 24 hours of cooling, the initial adhesion force was measured on the autograph according to the above disclosed procedures. Adhesion force after thermal aging was measured using the Geer oven in the same manner as above. The adhesion test results are shown in TABLE 5, below.

TABLE 5

CONTENTS AND ADHESION TEST RESULTS

| | EXAMPLES | | | | COMPARATIVE EXAMPLES | | |
|---|---|---|---|---|---|---|---|
| | 7 | 8 | 9 | 10 | 2 | 3 | 4 |
| Treating liquid No. | 8 | 9 | 10 | 11 | 12 | 13 | 14 |
| | RUBBER COMPOSITION | | | | RUBBER-CONTAINING COMPONENT | | |
| | 1 | 2 | 3 | 4 | 2 | 3 | 4 |
| Amount of rubber composition or rubber-containing | 90 | 90 | 90 | 90 | 90 | 90 | 90 |

TABLE 5-continued

CONTENTS AND ADHESION TEST RESULTS

| | EXAMPLES | | | | COMPARATIVE EXAMPLES | | |
|---|---|---|---|---|---|---|---|
| | 7 | 8 | 9 | 10 | 2 | 3 | 4 |
| Treating liquid No. | 8 | 9 | 10 | 11 | 12 | 13 | 14 |
| | RUBBER COMPOSITION | | | | RUBBER—CONTAINING COMPONENT | | |
| | 1 | 2 | 3 | 4 | 2 | 3 | 4 |
| component used (parts by weight) Methyl ethyl ketone (parts by weight) | 510 | 510 | 510 | 510 | 510 | 510 | 510 |
| Total (parts by weight) | 600 | 600 | 600 | 600 | 600 | 600 | 600 |
| Solid concentration (wt %) | 15 | 15 | 15 | 15 | 15 | 15 | 15 |
| Initial adhesion (kgf/25 mm) | 8.2 | 9.3 | 9.5 | 9.2 | 4.0 | 8.7 | 4.5 |
| Adhesion after thermal aging (kgf/25 mm) | 10.5 | 8.1 | 9.0 | 10.5 | 3.2 | 4.2 | 3.0 |

As is evident from these test results, the samples having the canvas treated with treating liquid nos. 8, 9, 10 or 11 comprising a rubber composition containing a carboxylated rubber in an amount in the range of about 1 to about 30 parts by weight, offer good adhesion in terms of both initial adhesion force and adhesion force after thermal aging as compared to treating liquid no. 12, which contained no carboxylated rubber, and treating liquid no. 14, which contained NBR that is not carboxylated. The test results show samples that use the rubber composition, EXAMPLES 7, 8, 9 and 10, actually exhibit an increase in adhesion after thermal aging. The sample of COMPARATIVE EXAMPLE 3, treated with treating liquid No. 13, which contains a large amount of carboxylated nitrile rubber (35 parts by weight) in excess of the disclosed maximum (about 30 parts by weight), proved unuseful because of significant reduction in adhesion force after thermal aging.

Examples 11 and 12, and Comparative Examples 5

Ethylene-propylene rubber, a rubber crosslinkable with organic peroxide and dicumyl peroxide, an organic peroxide, were kneaded using the Banbury mixer to yield the rubber-containing compound 5 and rubber compositions 5 and 6, the formulas thereof being shown in TABLE 6, below.

TABLE 6

| Component (ppw) | RUBBER-CONTAINING COMPOUND 5 | RUBBER COMPOSITION 5 | RUBBER COMPOSITION 6 |
|---|---|---|---|
| JSREP - 11[1] | 100 | 100 | 100 |
| Zinc oxide | 5 | 5 | 5 |
| Stearic acid | 1 | 1 | 1 |
| Anti-aging agent MB[2] | 3 | 3 | 3 |
| FEF carbon black | 40 | 40 | 40 |
| Ethylene dimethacrylate | 2.0 | 2.0 | 2.0 |
| Dicumyl peroxide | 2.7 | 2.7 | 2.7 |
| Additive 4[3] | | 5.0 | |
| Carboxylated SBR[4] | | | 5.0 |
| Total | 153.7 | 158.7 | 158.7 |

[1]Ethylene-propylene copolymer (EPR) produced by Japan Synthetic Rubber Co., Ltd.
[2]2-mercaptobenzimidazole
[3]Methacrylate compound of Formula 4, above.
[4]Terminal-carboxylated (—COOH) styrene butadiene rubber.

Next, the rubber-containing component and the rubber compositions of TABLE 6 were each dissolved in toluene in the amounts disclosed in TABLE 7, below, to yield treating liquids having a solid concentration of 15 wt %. The fiber material used was an aramid cord (Kevlar 49), 1500 d/2 yarns×15 twists/10 cm. The aramid cord was immersed in a treating liquid of RFL liquid having the formulation shown in TABLE 7, below, air dried and then heated at 120° C. for 15 minutes. After heat treatment, treated cord was embedded in each of rubber-containing component 5 and rubber compositions 5 and 6 and crosslinked at a surface pressure of 10 kg/cm² and 165° C. for 30 minutes in the same manner as in EXAMPLE 1 to produce samples. After 24 hours of cooling, the cord was subjected to a conventional pull-out test. The initial adhesion results are shown in TABLE 7.

TABLE 7

CONTENTS AND ADHESION TEST RESULTS

| | COMPARATIVE EXAMPLE 5 Rubber-containing component | EXAMPLES | |
|---|---|---|---|
| | | 11 | 12 |
| | | Rubber composition | |
| | 5 | 5 | 6 |
| Amount of rubber composition used (parts by weight) | 90 | 90 | 90 |
| Toluene (parts by weight) | 510 | 510 | 510 |
| Total (parts by weight) | 600 | 600 | 600 |
| Solid | 15 | 15 | 15 |

TABLE 7-continued

| CONTENTS AND ADHESION TEST RESULTS | | | |
|---|---|---|---|
| | COMPARATIVE | EXAMPLES | |
| | EXAMPLE 5 Rubber-containing component | 11 Rubber composition | 12 |
| | 5 | 5 | 6 |
| concentration (wt %) | | | |
| Initial adhesion (kgf/cm) in pull-out adhesion test | 8.0 | 14.2 | 17.5 |

As is evident from these test results, the samples of EXAMPLES 11 and 12, using a rubber-containing a carboxylated additive of Formula 4 or carboxylated rubber, respectively, offer improved adhesion with the aramid cord in comparison with the sample of COMPARATIVE EXAMPLE 5.

Comparative Example 6

The same nylon canvas as in EXAMPLES 1 to 6 was immersed in a RFL treating liquid whose formulation is shown in TABLE 8, below, dried and then laminated on a 3 mm thick press rolled sheet of the rubber-containing component of TABLE 1 and crosslinked at a crosslinking pressure of 10 kg/cm² and 165° C. for 30 minutes to produce a sample. After the sample was kept standing for 24 hours to cool, initial adhesion force was measured using the autograph. This testing revealed that no adhesion occurred between the nylon canvas and the rubber sheet.

TABLE 8

| RFL LIQUID | |
|---|---|
| Treating liquid component | (% by weight) |
| Resorcinol | 1 |
| 37 wt % formalin | 1 |
| JSR 0650[1] | 18 |
| Deionized water | 80 |

[1]Vinyl pyridine-SBR latex produced by Japan Synthetic Rubber Co., Ltd.

The rubber composition of the present invention, permits good adhesion upon crosslinking to fiber materials, offers good joining with fiber materials and offers good adhesion after thermal aging because it contains either an organic compound having two or more acrylate groups or methacrylate groups and one or more carboxyl groups in the molecular structure or a carboxy-modified rubber.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

We claim:

1. A rubber composition suitable to be adhered to a fiber material of a rubber product, the rubber composition comprising:
    an organic peroxide;
    a rubber that is crosslinkable with the organic peroxide wherein the rubber is selected from the group consisting of epichlorohydrin rubber and a rubber that is derived from an ethylenically unsaturated monomer; and
    an organic compound having two or more acrylate groups or methacrylate groups and one or more carboxyl groups in the molecular structure.

2. The rubber composition in accordance with claim 1 wherein for every 100 parts by weight of the crosslinkable rubber the organic peroxide is present in an amount in the range of about 1/10 to about 1/1000 mol and the organic compound is present in an amount in the range of about 0.5 to about 10 parts by weight.

3. The rubber composition in accordance with claim 2 wherein the organic peroxide is present in an amount in the range of about 1/50 to about 1/500 mol.

4. The rubber composition in accordance with claim 1 wherein the organic peroxide is selected from the group consisting of di-t-butyl peroxide, t-butylcumyl peroxide, dicumyl peroxide, 2,5-dimethyl-2,5-di(t-butyl peroxide)-hexane, 2,5-dimethyl-2,5-di(t-butylperoxy)-hexane, 3,1,3-bis-(t-butyl peroxy-isopropyl) benzene, 1,1-di-t-butylperoxy-3,3,5-trimethylcyclohexane, 1,1-di-t-butylperoxycyclohexane, 4,4-di-t-oxyvaleric acid-n-butyl, and 2,2-di-t-butylperoxybutane.

5. The rubber composition in accordance with claim 1 wherein the organic compound results from the esterification of a polyhydric alcohol, acrylic acid and/or methacrylic acid and subsequent esterification of the remaining alcohol group with polyhydric carboxylic acid or carboxylic anhydride to leave at least one carboxyl group in the molecular structure.

6. The rubber composition in accordance with claim 1 wherein the organic compound has at least one of the following four Chemical Formulas:

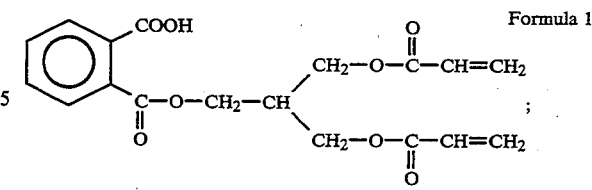

Formula 1

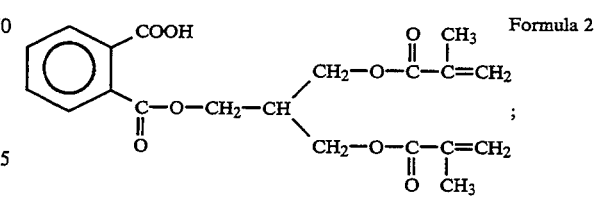

Formula 2

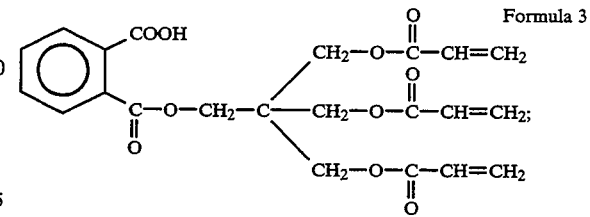

Formula 3 and

-continued

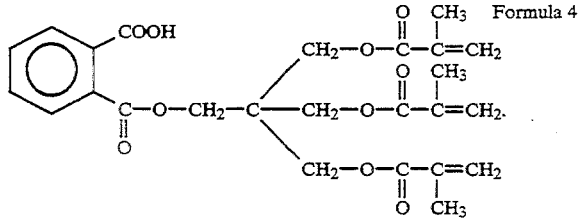

7. The rubber composition in accordance with claim 1 wherein the crosslinkable rubber is selected from the group consisting of natural rubber, polyisoprene rubber, styrene-butadiene rubber, polybutadiene rubber, nitrile rubber, hydrogenated nitrile rubber, chloroprene rubber, ethylene-propylene rubber, ethylene-vinyl acetate rubber, chlorinated polyethylene, chlorosulfonated polyethylene and alkylated chlorosulfonated polyethylene.

8. The composition in accordance with claim 1 wherein the organic compound is present in an amount in the range of about 2 to about 10 parts by weight.

9. A rubber composition suitable to be adhered to a fiber material, the rubber composition comprising:
an organic peroxide;
a rubber that is crosslinkable with the organic peroxide wherein the rubber is selected from the group consisting of epichlorohydrin rubber and a rubber that is derived from an ethylenically unsaturated monomer and wherein for every 100 parts by weight of the crosslinkable rubber the organic peroxide is present in an amount in the range of about 1/10 to about 1/1000 mole; and
an organic compound having two or more acrylate groups or methacrylate groups and one or more carboxyl groups in the molecular structure present in an amount in the range of about 0.5 to about 10 parts by weight.

10. The rubber composition in accordance with claim 9 wherein the organic peroxide is present in an amount of a range of about 1/50 to about 1/500 mole.

11. The rubber composition in accordance with claim 9 wherein the organic peroxide is selected from the group consisting of di-t-butyl peroxide, t-butylcumyl peroxide, dicumyl peroxide, 2,5-dimethyl-2,5-di(t-butyl peroxide)-hexane, 2,5-dimethyl-2,5-di(t-butylperoxy)-hexane, 3,1,3-bis-(t-butyl peroxy-isopropyl) benzene, 1,1-di-t-butylperoxy-3,3,5-trimethylcyclohexane, 1,1-di-t-butylperoxycyclohexane, 4,4-di-t-oxyvaleric acid-n-butyl, and 2,2-di-t-butylperoxybutane.

12. The rubber composition in accordance with claim 9 wherein the organic compound results from the esterification of a polyhydric alcohol, acrylic acid and/or methacrylic acid and subsequent esterification of the remaining alcohol group with polyhydric carboxylic acid or carboxylic anhydride to leave at least one carboxyl group in the molecular structure.

13. The rubber composition in accordance with claim 9 wherein the organic compound has at least one of the following four Chemical Formulas:

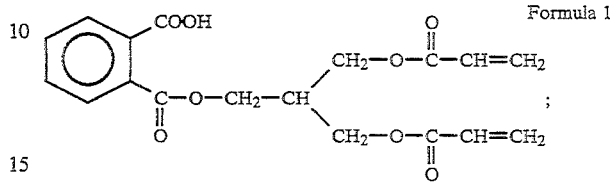

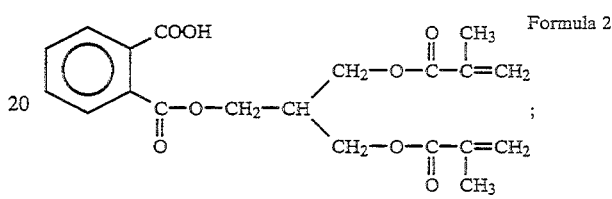

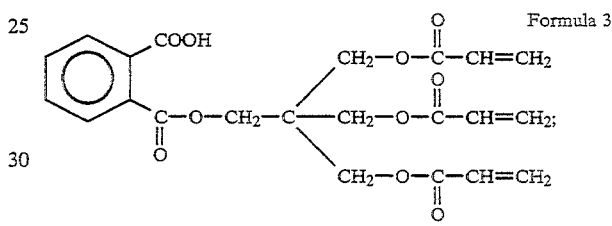

and

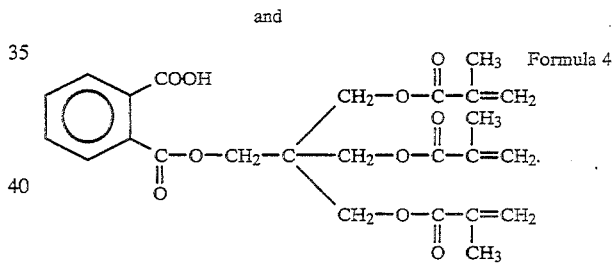

14. The rubber composition in accordance with claim 9 wherein the crosslinkable rubber is selected from the group consisting of natural rubber, polyisoprene rubber, styrene-butadiene rubber, polybutadiene rubber, nitrile rubber, hydrogenated nitrile rubber, chloroprene rubber, ethylene-propylene rubber, ethylene-vinyl acetate rubber, chlorinated polyethylene, chlorosulfonated polyethylene and alkylated chlorosulfonated polyethylene.

* * * * *